United States Patent
Dlugosz et al.

(10) Patent No.: US 11,719,098 B2
(45) Date of Patent: Aug. 8, 2023

(54) TOOL RETAINER

(71) Applicant: Kennametal Inc., Latrobe, PA (US)

(72) Inventors: Arkadiusz Dlugosz, Zory (PL); James R. Geyer, Manns Choice, PA (US)

(73) Assignee: KENNAMETAL INC., Latrobe, PA (US)

( * ) Notice: Subject to any disclaimer, the term of this patent is extended or adjusted under 35 U.S.C. 154(b) by 0 days.

(21) Appl. No.: 17/447,346

(22) Filed: Sep. 10, 2021

(65) Prior Publication Data
US 2023/0084514 A1    Mar. 16, 2023

(51) Int. Cl.
*E21C 35/197*    (2006.01)
*B23B 27/16*    (2006.01)

(52) U.S. Cl.
CPC .......... *E21C 35/197* (2013.01); *B23B 27/16* (2013.01)

(58) Field of Classification Search
CPC .................................................... E21C 35/197
See application file for complete search history.

(56) References Cited

U.S. PATENT DOCUMENTS

| | | |
|---|---|---|
| 3,499,685 A | 3/1970 | Kniff |
| 3,512,838 A | 5/1970 | Kniff |
| 3,519,309 A | 7/1970 | Engle et al. |
| 3,767,266 A | 10/1973 | Krekeler |
| 4,327,947 A * | 5/1982 | Bower, Jr. ............. E21C 35/197 411/521 |
| 4,921,310 A | 5/1990 | Hedlund et al. |
| 5,503,463 A * | 4/1996 | Ojanen ................. E21C 35/197 299/107 |
| 7,380,888 B2 * | 6/2008 | Ojanen ................. E21C 35/197 299/104 |
| 7,922,256 B2 | 4/2011 | Kammerer et al. |
| 7,922,257 B2 * | 4/2011 | Kammerer ............ E21C 35/197 299/107 |
| 9,702,251 B2 * | 7/2017 | Ojanen ................. E21C 35/197 |
| 2007/0024104 A1 | 2/2007 | Monyak et al. |
| 2007/0257545 A1 * | 11/2007 | Mouthaan ............. E21C 35/197 299/107 |
| 2009/0160237 A1 | 6/2009 | Kammerer |
| 2009/0162159 A1 | 6/2009 | Kammerer |

FOREIGN PATENT DOCUMENTS

DE    102008052389 A1    4/2010

\* cited by examiner

*Primary Examiner* — Janine M Kreck
(74) *Attorney, Agent, or Firm* — Christopher J. Owens

(57) ABSTRACT

A tool retainer is provided. The tool has a retainer sleeve having a longitudinal external tab to engage with an internal recessed radial groove with a tool holder, and wherein the retainer sleeve has two internal radial tabs that engage with a recessed groove in a rotating tool shank. A cutting tool assembly including a cutting bit and the retainer sleeve is provided.

22 Claims, 2 Drawing Sheets

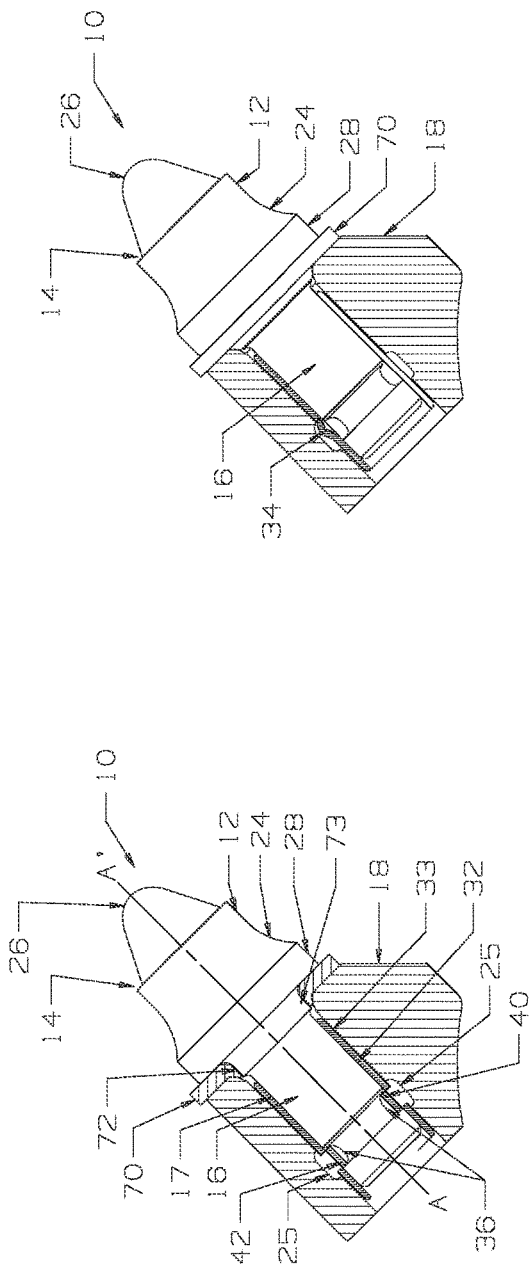
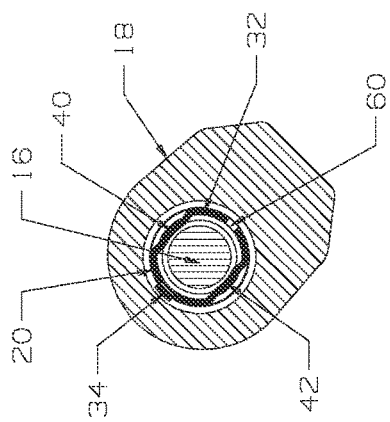
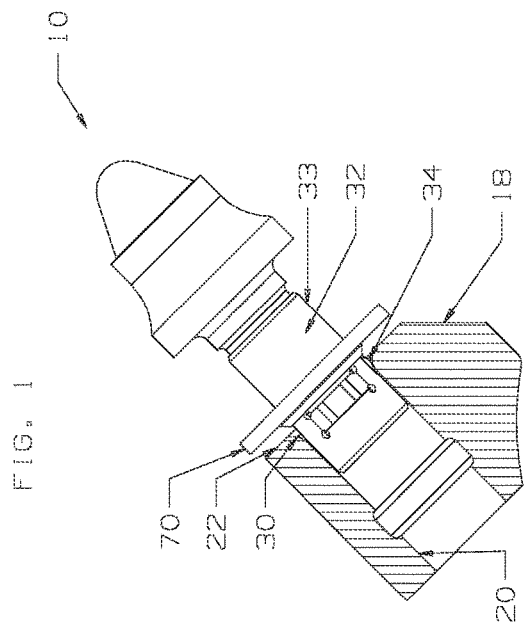

TOOL RETAINER

CROSS-REFERENCE TO RELATED APPLICATION

Not applicable.

STATEMENT REGARDING FEDERALLY SPONSORED RESEARCH OR DEVELOPMENT

Not Applicable.

BACKGROUND OF THE INVENTION

1. Field of the Invention

The present invention relates to a cutting tool assembly employed in earth working, mining or construction applications, and more particularly relates to a tool having a retainer sleeve having a longitudinal external tab to engage with an internal recessed groove of a cylindrical bore of a cutting bit holder, and wherein the retainer sleeve has two internal radial tabs that engage a recessed groove in a rotating tool shank.

2. Description of the Background Art

There is a need to prevent the tools from coming out of a holder during operation. This can happen from the tool coming out of the retainer (leaving the retainer in the holder) or the retainer coming out of the holder with the tool. If the force to install the tool with the retainer is too high then it becomes difficult to install the tools easily in the field. The current known retainers in use allow too much axial movement of the tool which allows the tools to come out of the holder causing the tool to bend or to break. The current known retainer designs contact the shank of the rotating tool at the top of the retainer causing the top of the retainer to wear thin. All of these problems of the known retainers can fail to prevent the tools from coming out of a holder during operation.

The background art discloses technology such as a rotary cone bit retained by a captive keeper ring, a pick-type mining tool that has a hard wear-resistant bushing in the holder, a pick-type mining bit with a cylindrical shank having a support block with a bore and a hard insert detachably and rotatably mounted in the bore. Further, the background art discloses a resilient retaining means for connecting work tools and work holders and ring-like members placed between a work tool and a work tool holder. Other background art discloses a keeper spring for connecting a mining tool to a work holder, or a retainer sleeve for a rotary bit including a longitudinally slit cylindrical portion and at least four circumferentially spaced tabs deformed radially inwardly from the longitudinal slit cylindrical portion. The background art also discloses a circular-shank tool comprising a shank held in a bore of a tool holder by a locking sleeve. The locking sleeve has one or more retaining elements that project inwards and engage in a peripheral groove in the shank of the tool.

This invention addresses the above disadvantages of the background art by incorporating a longitudinal tab to engage within a groove within a holder and two radial tabs that engage a groove in a rotating tool shank.

SUMMARY OF THE INVENTION

A tool retainer is provided.

In one embodiment of this invention a retainer sleeve comprising a longitudinal external tab to engage with an internal recessed groove of a cylindrical bore of a cutting bit holder, and wherein the retainer sleeve has two internal radial tabs that engage a recessed groove in a rotating tool shank.

In another embodiment of this invention, a tool is provided having a retainer sleeve having a longitudinal external tab to engage with an internal recessed radial groove with a tool holder, and wherein the retainer sleeve has two internal radial tabs that engage with a recessed groove in a rotating tool shank.

Another embodiment of this invention provides a cutting tool assembly comprising a cutting bit having a cutting element and a cylindrical shank, a cutting bit holder having an internal cylindrical bore that has an internal recessed radial groove, a washer located between the cutting bit and the cutting bit holder, and a cylindrical retainer sleeve wherein the cylindrical retainer sleeve has a radially outward projecting longitudinal external tab located on an outer wall of the cylindrical retainer sleeve, a first internal radial tab and a second internal radial tab, and wherein the cylindrical retainer sleeve fits inside the internal cylindrical bore of the cutting bit holder, and wherein the cylindrical shank fits inside the cylindrical retainer sleeve, and wherein the outward projecting longitudinal external tab of the cylindrical retainer sleeve fits into the internal recessed radial groove of the internal cylindrical bore of the cutting bit holder, and wherein the first internal radial tab and the second internal radial tab bias against and fit into a recess groove that is located on an outer wall of the cylindrical shank. In another embodiment of the cutting tool assembly of this invention, the outer wall of the cylindrical retainer sleeve has a split that forms an opening on the cylindrical retainer sleeve. The cylindrical retainer sleeve is made of a compressible material.

Another embodiment of a cutting tool assembly of this invention provides a cutting bit having a head, comprising a body located longitudinally below a cutting element and a shoulder located below the body, and a cylindrical shank that has an outer wall having a longitudinal length that extends in a longitudinal direction from below the shoulder, and a recess groove that is located on the outer wall of the cylindrical shank; a cutting bit holder having an internal cylindrical bore and a front face, and wherein the internal cylindrical bore has a mouth, and wherein the internal cylindrical bore has a longitudinal length the extends in a longitudinal direction of the cylindrical shank, and wherein the internal cylindrical bore has an internal recessed radial groove; a washer having a center hole, and wherein the washer is located between the shoulder of the cutting bit and the front face of the cutting bit holder; and a cylindrical retainer sleeve having an outer wall, said cylindrical retainer sleeve has a longitudinal length, and a split (60) that is located on the circumference of the outer wall that forms an opening on the cylindrical retainer sleeve and wherein the split extends in a longitudinal direction along the longitudinal length of said cylindrical retainer sleeve, and wherein the cylindrical retainer sleeve having a radially outward projecting longitudinal external tab located on the outer wall, a first internal radial tab and a second internal radial tab, and wherein the cylindrical retainer sleeve fits inside the internal cylindrical bore of the cutting bit holder, and wherein the cylindrical shank fits inside the cylindrical retainer sleeve, and wherein the outward projecting longitudinal external tab fits into the internal recessed radial groove of the internal cylindrical bore of the cutting bit holder, and wherein the first internal radial tab and the second internal radial tab bias against and fit into the recess groove that is located on the outer wall of the cylindrical shank. In another embodiment of this cutting tool assembly, the first internal radial tab has a first concave center portion, and a first convex end and a second convex end, wherein the first concave center portion of the first internal radial tab is located between the first convex end of the first internal radial tab and the second convex end of the first internal radial tab, and wherein the second internal radial tab has a first concave center portion, and a first convex end and a second convex end, wherein the second concave center portion of the second internal radial tab is located between the first convex end of the second internal radial tab and the second convex end of the second internal radial tab. The opening of the split of the cylindrical retainer sleeve is located opposite of the outward projecting longitudinal external tab of the cylindrical retainer sleeve, and wherein the opening of the split of the cylindrical retainer sleeve is located between the first internal radial tab and the second internal radial tab. The outward projecting longitudinal external tab of the cylindrical retainer sleeve fits into the internal recessed radial groove of the internal cylindrical bore of the cutting bit holder for preventing axial movement of the cylindrical retainer sleeve within the internal cylindrical bore of the cutting bit holder. The first internal radial tab and the second internal radial tab bias against and fit into the recess groove that is located on the outer wall of the cylindrical shank for preventing axial movement of the cutting bit. The cylindrical shank has a circumference that is smaller than a circumference of the shoulder. The internal cylindrical bore of the cutting bit holder has a circumference that is larger than the circumference of the cylindrical shank. The washer has a center hole circumference that is larger than the circumference of the cylindrical shank and a center hole circumference that is smaller than the circumference of the shoulder. The outer wall of the cylindrical retainer sleeve has a circumference that is smaller than the circumference of the internal cylindrical bore of the cutting bit holder. The cylindrical retainer sleeve is made of a compressible material. The compressible material is, for example, but not limited to, one of a 1070 or 65 Mn spring steel. In certain embodiments, the opening of the split is about 8 millimeters in width in an uncompressed state (i.e. free state, see FIG. 5), and wherein the split is compressed to a width of from less than about 8 millimeters to greater than about 1 millimeter (i.e. compressed state, see FIG. 7).

These and other embodiments of this invention shall be described in more detail herein and in the drawings that show certain embodiments of this invention.

BRIEF DESCRIPTION OF THE DRAWINGS

While various embodiments of this invention are illustrated in the drawings, the particular embodiments shown should not be construed to limit the claims. Various modifications and changes may be made without departing from the scope of the invention.

FIG. 1 shows a side cross sectional view of the retainer sleeve of this invention wherein the cylindrical shank of the cutting bit is within the cylindrical retainer sleeve.

FIG. 2 shows a side view of the retainer sleeve of this invention wherein the longitudinal external tab of the cylindrical retainer sleeve is engaged with the mouth of the internal cylindrical bore of the cutting bit holder.

FIG. 3 shows a side cross sectional view of the retainer sleeve of this invention wherein the longitudinal external tab of the cylindrical retainer sleeve is engaged with the internal recessed radial groove of the cutting bit holder.

FIG. 4 shows a bottom view of the retainer sleeve of this invention.

DETAILED DESCRIPTION OF THE INVENTION

Figure 8:
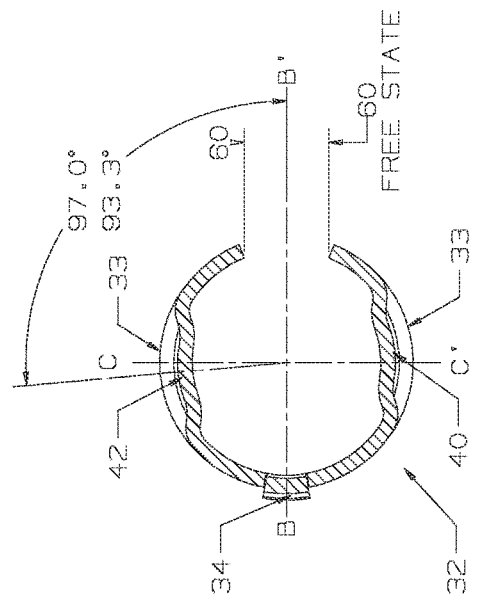
FIG. 8 shows a top cross sectional view of the cylindrical retainer sleeve in an uncompressed format (i.e. a free state) of this invention that describes the angles of an internal radial tab of the retainer sleeve.
Figure 7:
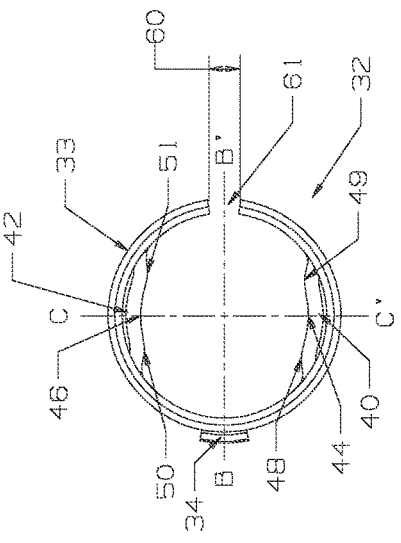
FIG. 7 show a top view of the cylindrical retainer sleeve in a compressed format (state) of this invention.
Figure 5:
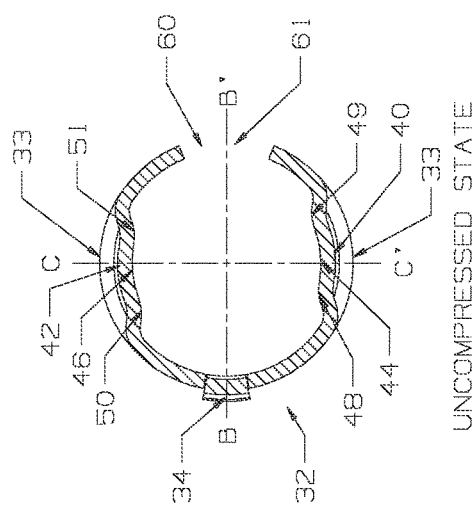
FIG. 5 shows a top cross sectional view of the cylindrical retainer sleeve in an uncompressed format (i.e. free state) of this invention.
Figure 6:
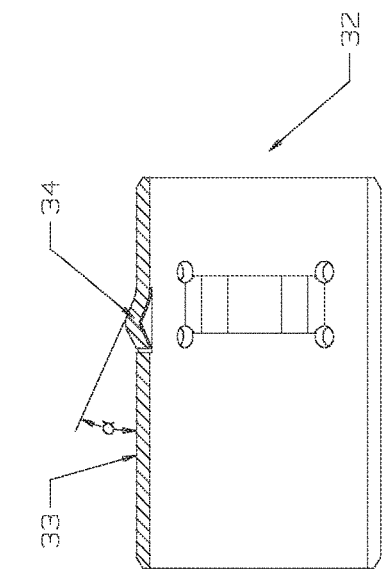
FIG. 6 shows a cross sectional view of the retainer sleeve showing the longitudinal external tab.

FIGS. 1-8 illustrate a retainer sleeve (32) comprising a longitudinal external tab (34) to engage with an internal recessed groove (25) of a cylindrical bore (20) of a cutting bit holder (18), and wherein the retainer sleeve (32) has two internal radial tabs (40, 42) that engage a recessed groove (36) in a rotating tool shank (16) in accordance with an embodiment of the present invention.

There has been a need to design a retainer sleeve (32) with at least one longitudinal external tab (34) which allows one to install a tool into a cutting holder (18) with an internal recessed grove (25) of a cylindrical bore (20) of said cutting bit holder (18), and at the same time exerting spring pressure of an expanding retainer sleeve (32) onto the inner cylindrical bore (20) of the cutting bit holder (18). Additionally, the retainer sleeve (32) should hold onto the tool with at least one internal radial tab (40 or 42) having two parallel flat surfaces perpendicular to the tool axis. After assembling, the internal radial tab(s) (40, or 42, or 40 and 42) will engage a recessed groove (36) on the shank (16) of the rotating tool, to prevent the tool from pulling out of the holder during operation.

The longitudinal external tab (34) is designed in a way to collapse the retainer sleeve (32) as it is installed to reduce the friction force between the retainer sleeve (32) and the bore (20) of a cutting bit holder (18). The longitudinal external tab (34) is also angled to lead into the bore (20) making it easier to install the tool as shown as angle α in FIG. 6. The angle α may range from 10°-40°, or between 20°-30°. The longitudinal external tab's (34) angled design also helps to make it easier to assemble the washer (70) onto the retainer sleeve (32) above the longitudinal external tab (34) during manufacturing. There needs to be at least one longitudinal external tab (34) to engage the internal recessed radial groove (25) of the bore (20). The internal radial tabs (40, 42) limit axial movement of the tool which helps to prevent the tools from coming out of the holder and bending/breaking. There needs to be at least one and no more than two internal radial tabs (40, or 42, or 40 and 42) to allow space for the longitudinal external tab (34) and a longitudinal split (60) which allows the retainer sleeve (32) to collapse (compress) during installation. The internal radial tabs (40, 42) limit the axial movement of the tools such that a top of the retainer sleeve (32) does not contact a hub (73) at an upper portion of a shank (16) of a rotating tool. The internal radial tabs (40, 42) of the retainer sleeve (32) will come into contact with both sides of the recessed groove (36) of the shank (16) of the tool. During install, the top of the recessed groove (36) will contact the top of the internal radial tab (40, or 42, or 40 and 42), and during removal, the bottom of the recessed groove (36) will contact the bottom of the internal radial tab (40, or 42, or 40 and 42). The recessed groove (36) of the shank (16) will contact at least one or both of the internal radial tabs (40, 42) of the retainer sleeve (32) before a top of the retainer sleeve (32) contacts the hub (73) at the upper portion of the shank (16).

Referring to FIGS. 1-8, in an embodiment of this invention, a tool (10) is provided comprising a retainer sleeve (32) having a longitudinal external tab (34) to engage with an internal recessed radial groove (25) with a tool holder (18), and wherein the retainer sleeve (32) has two internal radial tabs (40, 42) that engage with a recessed groove (36) in a rotating tool shank (16).

Referring to FIGS. 1-8, in another embodiment of this invention, a cutting tool assembly (10) is provided comprising a cutting bit (12) having a cutting element (26) and a cylindrical shank (16), a cutting bit holder (18) having an internal cylindrical bore (20) that has an internal recessed radial groove (25), a washer (70) located between the cutting bit (12) and the cutting bit holder (18), and a cylindrical retainer sleeve (32) wherein the cylindrical retainer sleeve (32) has a radially outward projecting longitudinal external tab (34) located on an outer wall (33) of the cylindrical retainer sleeve (32), a first internal radial tab (40) and a second internal radial tab (42), and wherein the cylindrical retainer sleeve (32) fits inside the internal cylindrical bore (20) of the cutting bit holder (18), and wherein the cylindrical shank (16) fits inside the cylindrical retainer sleeve (32), and wherein the outward projecting longitudinal external tab (34) of the cylindrical retainer sleeve (32) fits into the internal recessed radial groove (25) of the internal cylindrical bore (20) of the cutting bit holder (18), and wherein the first internal radial tab (40) and the second internal radial tab (42) bias against and fit into a recess groove (36) that is located on an outer wall (17) of the cylindrical shank (16). In another embodiment of the cutting tool assembly (10) of this invention, the outer wall (33) of the cylindrical retainer sleeve (32) has a split (60) that forms an opening (61) on the cylindrical retainer sleeve (32). The cylindrical retainer sleeve (32) is made of a compressible material.

Referring to FIGS. 1-8, another embodiment of a cutting tool assembly (10) is provided comprising a cutting bit (12) having a head (14) comprising a body (24) located longitudinally below a cutting element (26), and a shoulder (28) located below the body (24), and a cylindrical shank (16) that has an outer wall (17) having a longitudinal length that extends in a longitudinal direction from below the shoulder (28), and a recess groove (36) that is located on the outer wall (17) of the cylindrical shank (16); a cutting bit holder (18) having an internal cylindrical bore (20) and a front face (22), and wherein the internal cylindrical bore (20) has a mouth (30), and wherein the internal cylindrical bore (20) has a longitudinal length the extends in a longitudinal direction of the cylindrical shank (16), and wherein the internal cylindrical bore (20) has an internal recessed radial groove (25); a washer (70) having a center hole (72), and wherein the washer is located between the shoulder (28) of the cutting bit (12) and the front face (22) of the cutting bit holder (18); and a cylindrical retainer sleeve (32) having an outer wall (33), the cylindrical retainer sleeve (32) has a longitudinal length, and a split (60) that is located on the circumference of the outer wall (33) that forms an opening (61) on the cylindrical retainer sleeve (32) and wherein the split (60) extends in a longitudinal direction along the longitudinal length of the cylindrical retainer sleeve (32), and wherein the retainer sleeve (32) having a radially outward projecting longitudinal external tab (34) located on the outer wall (33), a first internal radial tab (40) and a second internal radial tab (42), and a wherein the cylindrical retainer sleeve (32) fits inside the internal cylindrical bore (20) of the cutting bit holder (18), and wherein the cylindrical shank (16) fits inside the cylindrical retainer sleeve (32), and wherein the outward projecting longitudinal external tab (34) fits into the internal recessed radial groove (25) of the internal cylindrical bore (20) of the cutting bit holder (18), and wherein the first internal radial tab (40) and the second internal radial tab (42) bias against and fit into the recess groove (36) that is located on the outer wall (17) of the cylindrical shank (16). In another embodiment of this cutting tool assembly, the first internal radial tab (40) has a first concave center portion (44), and a first convex end (48) and a second convex end (49), wherein the first concave center portion (44) of the first internal radial tab (40) is located between the first convex end (48) of the first internal radial tab (40) and the second convex end (49) of the first internal radial tab (40), and wherein the second internal radial tab (42) has a first concave center portion (46), and a first convex end (50) and a second convex end (51), wherein the second concave center portion (46) of the second internal radial tab (42) is located between the first convex end (50) of the second internal radial tab (42) and the second convex end (51) of the second internal radial tab (42). The opening (61) of the split (60) of the cylindrical retainer sleeve (32) is located opposite of the outward projecting longitudinal external tab (34) of the cylindrical retainer sleeve (32), and wherein the opening (61) of the split (60) of the cylindrical retainer sleeve (32) is located between the first internal radial tab (40) and the second internal radial tab (42). The outward projecting longitudinal external tab (34) of the cylindrical retainer sleeve (32) fits into the internal recessed radial groove (25) of the internal cylindrical bore (20) of the cutting bit holder (18) for preventing axial movement of the cylindrical retainer sleeve (32) within the internal cylindrical bore (20) of the cutting bit holder (18). The first internal radial tab (40) and the second internal radial tab (42) bias against and fit into the recess groove (36) that is located on the outer wall (17) of the cylindrical shank (16) for preventing axial movement of the cylindrical shank (16). The cylindrical shank (16) has a circumference that is smaller than a circumference of the shoulder (28). The internal cylindrical bore (20) of the cutting bit holder (18) has a circumference that is larger than the circumference of the cylindrical shank (16). The washer has a center hole (72) circumference that is larger than the circumference of the cylindrical shank (16) and a center hole (72) circumference that is smaller than the circumference of the shoulder (28). The outer wall (33) of the cylindrical retainer sleeve (32) has a circumference that is smaller than the circumference of the internal cylindrical bore (20) of the cutting bit holder (18). The cylindrical retainer sleeve (32) is made of a compressible material. The compressible material is, for example, but not limited to, one of a 1070 or 65 Mn spring steel. In certain embodiments, the opening (61) of the split (60) is about 8 millimeters in width in an uncompressed state (i.e. free state, FIG. 5), and wherein when the opening (61) of the split (60) is compressed, the compressed opening (61) has a width of from less than about 8 millimeters to greater than about 1 millimeter (i.e. compressed state, FIG. 7).

Referring to FIGS. 1-8, another embodiment of this invention provides a cylindrical retainer sleeve (32) comprising a cylindrical outer wall (33) that has a circumference and a longitudinal length, and a split (60) that is located on the circumference of the outer wall (33) that forms an opening (61) on the cylindrical retainer sleeve (32) and wherein the split (60) extends in a longitudinal direction along the longitudinal length of the cylindrical retainer sleeve (32), and wherein the cylindrical retainer sleeve (32) having a radially outward projecting longitudinal external tab (34) located on the outer wall (33), a first internal radial tab (40) and a second internal radial tab (42), and wherein the cylindrical retainer sleeve (32) fits inside an internal cylindrical bore (20) of a cutting bit holder (18), and wherein a cylindrical shank (16) fits inside the cylindrical retainer sleeve (32), and wherein the outward projecting longitudinal external tab (34) fits into an internal recessed radial groove (25) of the internal cylindrical bore (20) of the cutting bit holder (18), and wherein the first internal radial tab (40) and the second internal radial tab (42) bias against and fit into a recess groove (36) that is located on an outer wall (17) of the cylindrical shank (16). In another embodiment of the retainer sleeve of this invention, the cylindrical retainer sleeve (32) includes wherein the first internal radial tab (40) has a first concave center portion (44), and a first convex end (48) and a second convex end (49), wherein the first concave center portion (44) of the first internal radial tab (40) is located between the first convex end (48) of the first internal radial tab (40) and the second convex end (49) of the first internal radial tab (40), and wherein the second internal radial tab (42) has a first concave center portion (46), and a first convex end (50) and a second convex end (51), wherein the second concave center portion (46) of the second internal radial tab (42) is located between the first convex end (50) of the second internal radial tab (42) and the second convex end (51) of the second internal radial tab (42). The cylindrical retainer sleeve (32) includes wherein the opening (61) of the split (60) of the cylindrical retainer sleeve (32) is located opposite of the outward projecting longitudinal external tab (34) of the cylindrical retainer sleeve (32), and wherein the opening (61) of the split (60) of the cylindrical retainer sleeve (32) is located between the first internal radial tab (40) and the second internal radial tab (42). The cylindrical retainer sleeve (32) is made of a compressible material. The compressible material is, for example but not limited to, one of a 1070 or a 65 Mn spring steel. In a particular embodiment of this invention, the opening (61) of the split (60) is about 8 millimeters in width in an uncompressed state (i.e. free state, FIG. 5), and wherein when the opening (61) of the split (60) is compressed, the compressed opening (61) has a width of from less than about 8 millimeters to greater than about 1 millimeter (i.e. compressed state, FIG. 7).

It will be appreciated by those persons skilled in the art that the cylindrical retainer sleeve of this invention is dimpleless. As used herein, the term "dimpleless" means the absence of protruding outwardly directed bulges or bumps. The cylindrical retainer sleeve of this invention is compressible such that in the compressed state at least one or more millimeters as a width of the opening of the split is maintained. FIG. 8 shows that the shows a top cross sectional view of the cylindrical retainer sleeve in an uncompressed format (i.e. a free state) of this invention wherein an embodiment of this invention shows that the first concave center portion of the second internal radial tab of the cylindrical retainer sleeve is positioned in relation to the horizontal axis of the cylindrical retainer sleeve B-B' is from about 93.3 degrees to about 97.0 degrees.

As used herein, "including," "containing" and like terms are understood in the context of this application to be synonymous with "comprising" and are therefore open-ended and do not exclude the presence of additional undescribed or unrecited elements, materials, phases or method steps. As used herein, "consisting of" is understood in the context of this application to exclude the presence of any unspecified element, material, phase or method step. As used herein, "consisting essentially of" is understood in the context of this application to include the specified elements, materials, phases, or method steps, where applicable, and to also include any unspecified elements, materials, phases, or method steps that do not materially affect the basic or novel characteristics of the invention.

For purposes of the description above, it is to be understood that the invention may assume various alternative variations and step sequences except where expressly specified to the contrary. Moreover, all numbers expressing, for example, quantities of ingredients used in the specification and claims, are to be understood as being modified in all instances by the term "about". Accordingly, unless indicated to the contrary, the numerical parameters set forth are approximations that may vary depending upon the desired properties to be obtained by the present invention. At the very least, and not as an attempt to limit the application of the doctrine of equivalents, each numerical parameter should at least be construed in light of the number of reported significant digits and by applying ordinary rounding techniques.

It should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and plural encompasses singular, unless specifically stated otherwise. In addition, in this application, the use of "or" means "and/or" unless specifically stated otherwise, even though "and/or" may be explicitly used in certain instances. In this application, the articles "a," "an," and "the" include plural referents unless expressly and unequivocally limited to one referent.

Whereas particular embodiments of this invention have been described above for purposes of illustration, it will be evident to those skilled in the art that numerous variations of the details of the present invention may be made without departing from the invention as defined in the appended claims.

What is claimed is:

1. A cutting tool assembly comprising a cutting bit having a cutting element and a cylindrical shank, a cutting bit holder having an internal cylindrical bore that has an internal recessed radial groove, a washer is located between said cutting bit and said cutting bit holder, and a cylindrical retainer sleeve wherein said cylindrical retainer sleeve has only a single radially outward projecting longitudinal external tab located on an outer wall of said cylindrical retainer sleeve, and wherein said outer wall of said cylindrical retainer sleeve has only two internal radial tabs opposite each other, and wherein the radially outward projecting longitudinal external tab is located centered between the two internal radial tabs, wherein said outer wall of said cylindrical retainer sleeve has a split that forms an opening on said cylindrical retainer sleeve, wherein said opening of said split of said cylindrical retainer sleeve is located opposite of said single radially outward projecting longitudinal external tab, and wherein said cylindrical retainer sleeve fits inside said internal cylindrical bore of said cutting bit holder, and wherein said cylindrical shank fits inside said cylindrical retainer sleeve, and wherein said outward projecting longitudinal external tab of said cylindrical retainer sleeve fits into said internal recessed radial groove of said internal cylindrical bore of said cutting bit holder, and wherein each of said two internal radial tabs bias against and fit into a recess groove that is located on an outer wall of said cylindrical shank.

2. The cutting tool assembly of claim 1 wherein said cylindrical retainer sleeve is made of a compressible material.

3. A cutting tool assembly comprising:
a cutting bit having a head comprising of a body located longitudinally below a cutting element and a shoulder located below said body, and a cylindrical shank that has an outer wall having a longitudinal length that extends in a longitudinal direction from below said shoulder, and a recess groove that is located on said outer wall of said cylindrical shank;
a cutting bit holder having an internal cylindrical bore and a front face, and wherein said internal cylindrical bore has a mouth, and wherein said internal cylindrical bore has a longitudinal length that extends in a longitudinal direction of said cylindrical shank, and wherein said internal cylindrical bore has an internal recessed radial groove;
a washer having a center hole, and wherein said washer is located between said shoulder of said cutting bit and said front face of said cutting bit holder; and
a cylindrical retainer sleeve having an outer wall, said cylindrical retainer sleeve has a longitudinal length, and a split that is located on the circumference of said outer wall that forms an opening on said cylindrical retainer sleeve and wherein said split extends in a longitudinal direction along the longitudinal length of said cylindrical retainer sleeve, and wherein said retainer sleeve having only a single radially outward projecting longitudinal external tab located on said outer wall, and wherein said outer wall of said retainer sleeve has only two internal radial tabs opposite each other, and wherein the radially outward projecting longitudinal external tab is located centered between the two internal radial tabs, and wherein said opening of said split of said cylindrical retainer sleeve is located opposite of said radially outward projecting longitudinal external tab, and wherein said cylindrical retainer sleeve fits inside said internal cylindrical bore of said cutting bit holder, and wherein said cylindrical shank fits inside said cylindrical retainer sleeve, and wherein said outward projecting longitudinal external tab fits into said internal recessed groove of said internal cylindrical bore of said cutting bit holder, and wherein each of said two internal radial tabs bias against and fit into said recess groove that is located on said outer wall of said cylindrical shank.

4. The cutting tool assembly of claim 3 wherein each of said two internal radial tabs has a first concave center portion, and a first convex end and a second convex end, wherein said first concave center portion is located between said first convex end and said second convex end.

5. The cutting tool assembly of claim 3 wherein said outward projecting longitudinal external tab of said cylindrical retainer sleeve fits into said internal recessed groove of said internal cylindrical bore of said cutting bit holder for preventing axial movement of said cylindrical retainer sleeve within said internal cylindrical bore of said cutting bit holder.

6. The cutting tool assembly of claim 3 wherein each of said two internal radial tabs bias against and fit into said recess groove that is located on said outer wall of said cylindrical shank for preventing axial movement of said cutting bit.

7. The cutting tool assembly of claim 3 wherein said cylindrical shank has a circumference that is smaller than a circumference of said shoulder.

8. The cutting tool assembly of claim 3 wherein said internal cylindrical bore of said cutting bit holder has a circumference that is larger than the circumference of said cylindrical shank.

9. The cutting tool assembly of claim 3 wherein said washer has a center hole circumference that is larger than the circumference of said cylindrical shank and a center hole circumference that is smaller than the circumference of said shoulder.

10. The cutting tool assembly of claim 3 wherein said outer wall of said cylindrical retainer sleeve has a circumference that is smaller than the circumference of said internal cylindrical bore of said cutting bit holder.

11. The cutting tool assembly of claim 3 wherein said cylindrical retainer sleeve is made of a compressible material.

12. The cutting tool assembly of claim 11 wherein said opening of said split is about 8 millimeters in width in an uncompressed state, and wherein said opening of said split is compressed to a width of from less than about 8 millimeters to greater than about 1 millimeter.

13. A cylindrical retainer sleeve comprising:
a cylindrical outer wall that has a circumference and a longitudinal length, and a split that is located on the circumference of said outer wall that forms an opening on said cylindrical retainer sleeve and wherein said split extends in a longitudinal direction along the longitudinal length of said cylindrical retainer sleeve, and wherein said retainer sleeve has only a single radially outward projecting longitudinal external tab located on said outer wall, and wherein said outer wall of said retainer sleeve has only two internal radial tabs opposite each other, and wherein the radially outward projecting longitudinal external tab is located centered between the two internal radial tabs, and wherein said opening of said split of said cylindrical retainer sleeve is located opposite of said radially outward projecting longitudinal external tab, and wherein said cylindrical retainer sleeve fits inside and an internal cylindrical bore of a cutting bit holder, and wherein a cylindrical shank fits inside said cylindrical retainer sleeve, and wherein said outward projecting longitudinal external tab fits into an internal recessed radial groove of said internal cylindrical bore of said cutting bit holder, and wherein each of said two internal radial tabs bias against and fit into a recess groove that is located on an outer wall of said cylindrical shank.

14. The cylindrical retainer sleeve of claim 13 including wherein each of the two internal radial tabs has a first concave center portion, and a first convex end and a second convex end, wherein said first concave center portion is located between said first convex end and said second convex end.

15. The cylindrical retainer sleeve of claim 13 wherein said cylindrical retainer sleeve is made of a compressible material.

16. The cylindrical retainer sleeve of claim 13 wherein said opening of said split is about 8 millimeters in width in an uncompressed state, and wherein said opening of said split is compressed to a width of from less than about 8 millimeters to greater than about 1 millimeter.

17. A tool comprising a retainer sleeve having only a single longitudinal external tab on an outer wall to engage with an internal recessed radial groove of a tool holder, and wherein said outer wall of said retainer sleeve has only two internal radial tabs opposite each other that engage with a recessed groove in a rotating tool shank, wherein said longitudinal external tab is located centered between the two internal radial tabs, said retainer sleeve having a split that is located on the circumference of the outer wall that forms an opening on said retainer sleeve, and wherein said split extends in a longitudinal direction along a longitudinal length of said retainer sleeve, and wherein said opening of said split is located opposite of said single longitudinal external tab.

18. The tool of claim 17 wherein said longitudinal external tab is angled to lead into a bore of said tool holder making it easier to install the tool.

19. The tool of claim 18 wherein said angle of said longitudinal external tab is in the range of 10° to 40°.

20. The tool of claim 17 wherein the single longitudinal external tab has a first end and a second end opposite the first end, and wherein the first end is connected to the retainer sleeve and the second end is not connected to the retainer sleeve.

21. The tool of claim 17 wherein each of said two internal radial tabs has a first concave center portion, and a first convex end and a second convex end, wherein said first concave center portion is located between said first convex end and said second convex end.

22. The tool of claim 17 wherein each of the two radial internal tabs have two parallel flat surfaces perpendicular to an axis of the tool.

* * * * *